United States Patent
Thomasset et al.

(10) Patent No.: US 11,325,322 B2
(45) Date of Patent: May 10, 2022

(54) PROCESS FOR PRODUCING A PACKAGING WELD

(71) Applicant: AISAPACK HOLDING SA, Vouvry (CH)

(72) Inventors: Jacques Thomasset, Neuvecelle (FR); Yan Gex-Collet, Choëx (CH); Gaël Bussien, Le Bouveret (CH); François Fleuret, Yverdon-les-Bains (CH); Yann Lepoittevin, Lausanne (CH); Florent Monay, Monthey (CH)

(73) Assignee: AISAPACK HOLDING SA, Vouvry (CH)

( * ) Notice: Subject to any disclaimer, the term of this patent is extended or adjusted under 35 U.S.C. 154(b) by 0 days.

(21) Appl. No.: 17/193,660

(22) Filed: Mar. 5, 2021

(65) Prior Publication Data

US 2021/0187872 A1    Jun. 24, 2021

Related U.S. Application Data

(63) Continuation-in-part of application No. PCT/IB2019/057551, filed on Sep. 6, 2019.

(30) Foreign Application Priority Data

Sep. 7, 2018  (EP) ..................... 18193142

(51) Int. Cl.
*B29C 65/00* (2006.01)
*B29C 65/18* (2006.01)

(52) U.S. Cl.
CPC ............ *B29C 66/954* (2013.01); *B29C 65/18* (2013.01); *B29C 66/1122* (2013.01); *B29C 66/849* (2013.01)

(58) Field of Classification Search
CPC ... B29C 65/18; B29C 66/1122; B29C 66/849; B29C 66/94; B29C 66/954
See application file for complete search history.

(56) References Cited

U.S. PATENT DOCUMENTS

| 5,873,965 | A | 2/1999 | Greller | |
|---|---|---|---|---|
| 2002/0144984 | A1* | 10/2002 | Mori | B23K 26/244 219/121.64 |
| 2020/0025720 | A1* | 1/2020 | Quaegebeur | G01N 29/12 |

FOREIGN PATENT DOCUMENTS

| DE | 4230882 A1 | 3/1994 |
|---|---|---|
| EP | 0532865 A1 | 3/1993 |

(Continued)

OTHER PUBLICATIONS

European Search Report dated Feb. 27, 2019, issued in European Patent Application No. 18193142.9, 2 pages.

(Continued)

*Primary Examiner* — George R Koch
(74) *Attorney, Agent, or Firm* — Nixon & Vanderhye P.C.

(57) ABSTRACT

A process for continuous welding of a sheet of plastic material for manufacturing flexible packages, comprising a step of positioning the sheet relative to the welding device, putting ends of the sheet into contact, forming a weld by heating, pressing and cooling the ends of the sheet that are in contact, acquiring a primary temporal signal with a sensor, the primary temporal signal proportional to a thickness of the weld, transforming the primary temporal signal into a primary frequency signal and defining a low-frequency spectrum, a medium-frequency spectrum, and a high-frequency spectrum from the primary frequency signal, reconstructing a secondary low-frequency signal from the low-frequency spectrum, and determining the thickness of the weld based on the secondary low-frequency signal.

12 Claims, 8 Drawing Sheets

(56) References Cited

FOREIGN PATENT DOCUMENTS

EP          3 292 942        3/2018
JP         S63-253205 A     10/1988
WO         2011/012930       2/2011

OTHER PUBLICATIONS

European Written Opinion dated Feb. 27, 2019, issued in European Patent Application No. 18193142.9, 6 pages.
Written Opinion of the International Searching Authority dated Dec. 11, 2019, issued in International Application No. PCT/IB2019/057551, 6 pages.
International Search Report for PCT/IB2019/057551, dated Dec. 11, 2019, 4 pages.

\* cited by examiner

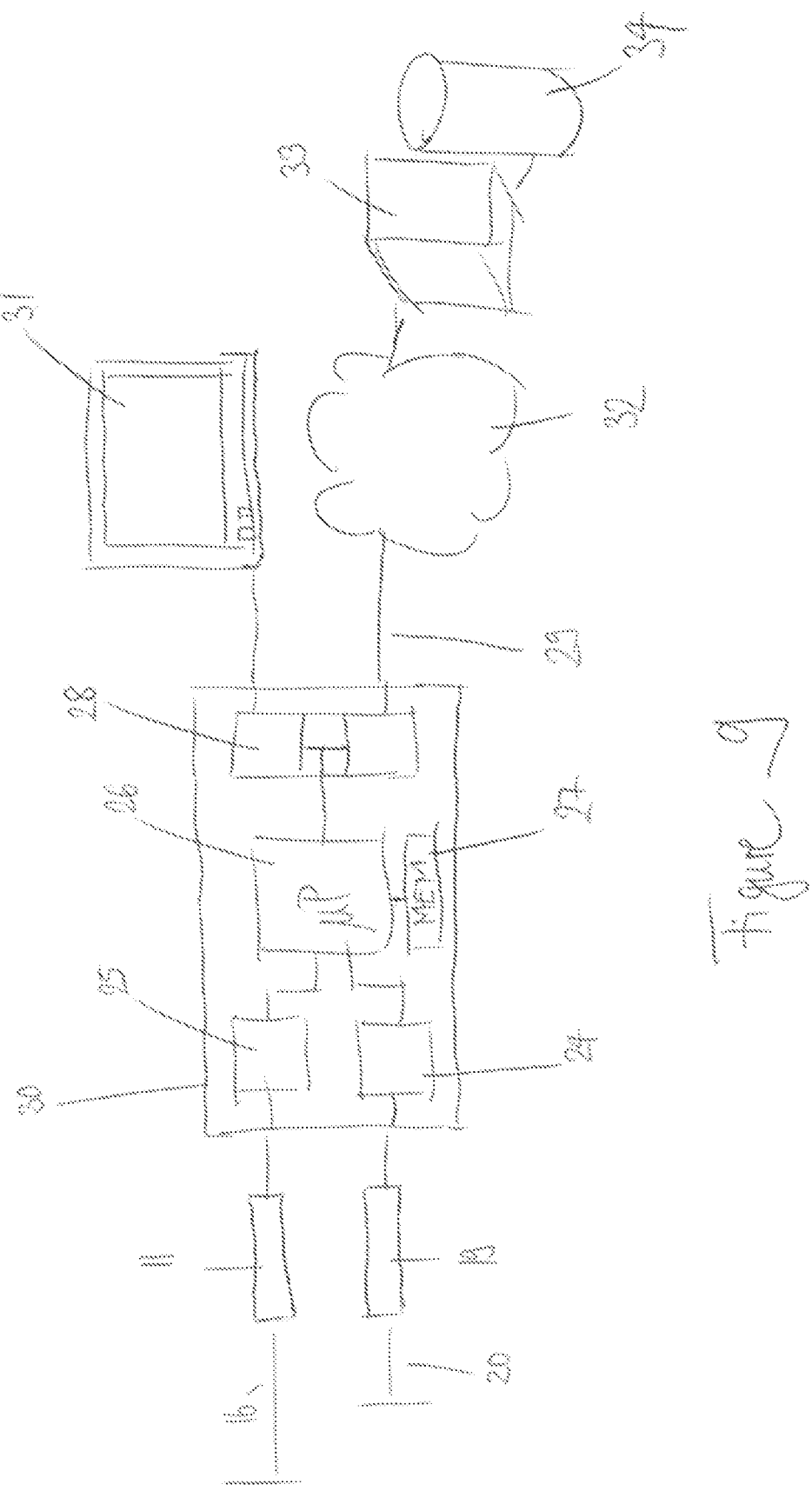

PROCESS FOR PRODUCING A PACKAGING WELD

CROSS-REFERENCE TO RELATED APPLICATIONS

The present patent application claims benefit of priority to International patent application No. PCT/IB2019/057551 that was filed on Sep. 6, 2019 and that designated the United States, and is also a continuation-in-part (CIP) and "bypass" application under 35 U.S.C. §§ 111(a) and 365(c) of said International patent application, and claims foreign priority to European Patent Application No. EP 18193142.9 that was filed on Sep. 7, 2018, the contents of both these document being herewith incorporated by reference in their entirety.

FIELD OF THE INVENTION

The invention is directed to the field of packages, and more particularly flexible packages produced by welding a plastic sheet. The invention can be used, for example, for producing packaging tubes intended for packaging liquid or viscous products. The present invention is not limited to this single application of producing packaging tubes, but can be applied to other fields in which an object is produced by welding sheets, for example made of plastic.

BACKGROUND

United States Patent Publication No. 2012/0193017 describes a process for welding a package made of plastic material that is tubular in shape, this reference herewith incorporated by reference in its entirety. The process comprises the following operations:
- a rolling operation during which a laminate is rolled up,
- an arranging operation during which the ends of the laminate are arranged next to each other,
- an extrusion operation during which a bead of molten resin is extruded and deposited on said ends,
- a melting operation during which said ends are melted by means of said bead,
- a compression operation during which the weld zone is pressed, and
- a cooling operation during which the weld is cooled.

For example, patent application EP3292942 describes a process and a device for continuously inspecting the seal tightness of a weld at the end of a tube containing a product. The invention of EP3292942 is more particularly, but not exclusively, intended for the field of packaging sterile liquid or pasty cosmetic products in a flexible tubular package, one end of which is flattened and welded to ensure it is tightly sealed. Such a package makes it possible to dispense, through an opening that can generally be closed again at one of its ends, a precise quantity of the product it contains, depending on the pressure applied to the tube.

The invention of EP3292942 is intended for an automatic packaging line for packaging such a product in such a package, at production speeds of the order of 200 tubes filled per minute.

According to one implementation example of the process known from EP3292942, such a packaging line for packaging into a tubular package comprises a filling station where the product is poured into the open end of the tube, positioned under a hopper, by a dosing and filling device. According to one implementation example, the tube is located in a vertical position under the hopper, the open end being at the top. The packaging line comprises a closing station in which the open end of the tube is closed by weld. According to one embodiment, the closing of this open end comprises pinching the end of the tube, the lips pinched in this way then being welded together by suitable means. The tube is then discharged from the packaging zone.

FIG. 1 of the background art document EP3292942 shows the welded end (110) of a tube (100) after such an operation. This welded end (110) is a ribbed zone (112) corresponding to the welding of the lips of the end of the tube (100). Said ribbed zone (112) extends across the entire width of the tube over a height of generally between 5 mm and 7 mm. According to one implementation example, surplus material at the top end of the ribbed zone is cut off, after the welding operation, in order to reduce the height of said ribbed zone and improve the appearance of the tube. According to one common embodiment, the welding of the ribbed zone is carried out by ribbed jaws, such that this zone is embossed over a large proportion of its surface area, but often comprises a flat zone (113) on which an identification code or legal disclaimers are engraved. According to other embodiments, jaws without ribs are used and the so-called ribbed zone is smooth.

In order to reduce the risks of faulty welding, pinching and welding are carried out between 0.5 mm and several millimeters above the filling level (111) of the tube, thus preventing the welded faces from being polluted by the packaged product.

If the product contained in the tube is a sterile cosmetic product, filling takes place in a sterile environment. However, even in such filling conditions, it is desirable for the bottom end of the weld, on the product side, to be as close as possible to the level of the product in the tube, such that as little air as possible is trapped inside the tube, in order to ensure the product is well conserved. The weld is therefore made flush with the level of product inside, thus increasing the risks of pollution of the welded interfaces by the product and faulty welding.

In these circumstances, if the height of the pinch is poorly positioned relative to the filling level of the tube, the weld zone is likely to be polluted with product and the tube is likely to have a sealing defect. This sealing defect is not always visible on the end product and, in some instances, only becomes apparent when the tube is squeezed for the first time by the end user. Moreover, given the high production speeds, such a defect is likely to recur on a large number of tubes. Sealing defects have many causes and result, for example, from poor adjustment, wear to the welding jaws, an error or drift in the welding or pinch parameters, or even the filling parameters, this list being neither exhaustive nor limiting. Even if a sealing defect does not give rise to leaks, it can result in the product becoming contaminated by micro-organisms and compromise its conservation. The invention of EP3292942 aims to solve the disadvantages of the prior art by detecting, in a non-destructive manner, any sealing defect in the end closure of a packaging tube just after weld has been carried out, without slowing down the production speed. The process and the device that form the subject matter of the invention of EP3292942 thus make it possible to discard any tube that has such a defect and warn the operator of the packaging line of the occurrence of such a defect, such that he or she can take suitable measures to remedy the situation.

Document JP S63 253205 describes a process for inspecting the welded end of a tube. Given the embossed shape of the welded end, and the form of the observed defects, such as an inclusion of product in the weld, this prior art process does not make it possible to reliably detect the defects targeted par the invention on a high-speed packaging line, and results, depending on the sensitivity of the adjustment, either in tubes containing defects being allowed to pass, or in untimely stoppages of the packaging line. However, intervening on a sterile packaging line is problematic, and starting it up again following intervention involves restoring sterility. To this end, the invention of EP3292942 concerns a process for inspecting the seal tightness of a the welded end of a tubular package after it has been filled, in particular with a sterile product, comprising the steps consisting in:

making a first weld on the end of the tube after pinching the lips so as to create a smooth heel;
measuring the thickness of said heel.

Therefore, in EP3292942, a first weld is made as close as possible to the contents of the tube when it is pinched before the top part, above the heel, is itself welded by bringing the lips of the tube together in an embossed pattern. The heel is smooth, and has a predictable thickness, substantially equal to twice the thickness of the walls of the tube. It is therefore easy to reliably check for any welding defect, whether localized, due to the presence of product in the heel, or extensive. The invention of EP3292942 is advantageously implemented according to the embodiments and variants disclosed in EP3292942.

For example, according to one embodiment of EP3292942, the process forming the subject matter of the invention comprises, in particular, a step consisting in detecting a variation in the thickness of the heel in a direction parallel to the length of the weld.

The detection of a variation in thickness can be implemented more easily and reliably than an exact measurement of the thickness, which is also likely to vary depending on the batches of tubular packages.

Therefore, the process that is the subject matter of the invention of EP3292942 advantageously comprises the steps consisting, in particular, in:

obtaining an acceptable limit of variation in the thickness of the measured part;
if the variation in thickness detected during step (iii) is greater than the acceptable limit of variation, discarding the tubular package.

As a result of the process and device of EP3292942, faulty tubular packages are systematically rejected.

In summary: EP3292942 describes an in-line process for inspecting the seal tightness of the welded end of a package after it has been filled, and the invention of this prior art consists in measuring the thickness of the heel of the tube in order to ensure seal tightness, and EP3292942 allows the packages whose weld thickness falls outside the acceptable variations to be rejected.

However, in EP3292942, the thickness inspection takes place on a packaging line that moves forward intermittently. The thickness is measured during the stop phase and not during the indexing phase. The measurement can therefore be taken "statically" in conditions similar to measurements taken in a laboratory. Therefore, this publication does not contribute any improvement from this point of view.

Therefore, EP3292942 does not make it possible to measure the thickness of the weld during the process for producing the weld in a machine that is operating which produces interference noise related to this operation.

EP3292942 does not make it possible to measure the thickness of the weld during the production process if the weld is continuously moving relative to the welding and measuring tool.

In the process proposed by EP3292942, the vibrations are not problematic because they are cancelled out by the fact that measurement takes place at the same time from both sides. The problem of vibrations or noise is not disclosed in EP3292942 because it is not a problem.

Aspects of the present invention are described in greater detail below, one of the main problems is that of the amplitude of the interference noise (vibrations) relative to the amplitude of the measured variations. Since it is not possible, in the configurations and embodiments according to the invention, to measure simultaneously from both sides, the process proposed in EP3292942 cannot be applied.

Apart from the shortcomings of the background art mentioned above, the problems to be solved that are encountered in an industrial production environment are, in particular, the following, in the context of the present invention of continuously producing packages.

Taking accurate measurements on a welding machine in an industrial environment, bearing in mind that the signal to be measured is lost in interference noise linked to the vibrations of the machine and generated by its operation, and the desired accuracy of the measurement is approximately 10 times finer than the amplitude of the interference noise linked to the industrial environment. Therefore substantially improved methods and processes for measuring weld thicknessed are desired.

SUMMARY

According to some aspects of the present invention, it is possible to overcome the abovementioned disadvantages and take the desired measurements with the desired level of accuracy, in a continuous production environment.

One aim of the invention is to improve the processes and devices for producing welded packages, in particular packaging tubes intended for packaging liquid or viscous products.

Another aim is to propose processes and devices that can be reliably used in an industrial environment during production, despite the vibrations and noise produced in this setting.

Another aim is to propose processes and devices that can be implemented in a simple and effective manner.

Another aim is to propose modular processes and systems that can be implemented on existing machines.

Other aims and solutions provided by the present invention will be described in the text that follows and in the embodiments of the present invention.

Some aspects of the invention relates in particular to a process for continuously welding a sheet at a high production speed, comprising a step of measuring the thickness of the weld during production, without stopping the machine. Analyzing the signal obtained during this measurement makes it possible to subsequently determine the quality of the weld and decide whether the tube meets the desired conditions in terms of quality.

The process according to the invention is intended, in particular but not exclusively, for the field of flexible packaging tubes. The market segment in question is the following, given as a non-limiting example: liquid and viscous products for the oral care market, the cosmetics market, the pharmaceutical field and the food industry.

The welding process can comprise, in particular, the following steps:
Unrolling a printed sheet, for example from a reel
Cutting to the required width
Shaping the cut sheet into a tubular shape
Positioning the ends to be welded
Heating the positioned ends Compressing the positioned ends Cooling Optionally reshaping Measuring the thickness Cutting to a predetermined length in order to obtain printed tubular segments In subsequent steps, in order to produce the package (for example a tube) the following steps can be performed:

The tubular segments are welded at a tube shoulder (by welding, or by compression or injection overmolding)

Membrane sealing

Capping

The package is filled as follows, also in subsequent steps:

Filling through the end that is still open

Welding the heel in order to form the final package with its product.

According to one of the principles of the invention, inspecting some of the properties of the weld helps to ensure the quality of said weld. Since inspection takes place continuously during production, the invention makes it possible to react swiftly in the production process when the weld does not meet the desired conditions, or when drift is observed in certain parameters. It is therefore not necessary to wait until the end of a complete production run and the measurement of samples of produced tubes in a laboratory, as described below, the principle of the invention being far more advantageous from an economic point of view in the event of a defect because it avoids discarding the whole production run, allowing an immediate reaction as soon as drift and/or a defect is observed.

At present, inspection is carried out by checking produced and cut tubes. Specifically, such tubes are removed from a production run (for example in batches) and these tubes are cut and/or measured individually in order to determine whether or not they meet the required quality conditions. However, these tests and measurements do not allow swift feedback and reaction at the production level, meaning that many faulty tubes can be produced before there is a reaction in the production machines, resulting in significant quantities of waste and discards. Stopping production at a machine is also very costly and should be avoided as far as possible.

Therefore, according to the principle of the invention, the aim is to carry out a quality inspection that is relevant during production, continuously, that allows an immediate reaction in the event of a detected defect or drift in the production process over time. Moreover, measurement taking place permanently during production also makes it possible to detect machine problems, as explained in the description that follows.

According to some aspects of the present invention, it has been demonstrated that the stability of the thickness of the weld makes it possible to conclude with regards to the stability and quality of the weld and, therefore, to guarantee the properties of the weld.

As a result of the principle set out above, it follows that measuring the thickness of the weld makes it possible to measure the stability of the weld. Therefore, a constant weld thickness results in a constant rate of compression of the weld if the thickness of the sheet is constant. Since the compression of the weld has an influence on the flows of molten material, constant compression of the weld results in identical flows of material and, therefore, no change in the configuration and properties of the weld.

In one embodiment, small variations in thickness can be accepted, for example between acceptable limit values. These limit values can be defined in advance and/or based on experience and/or learning and based, for example, on the materials used or the product to be formed.

In the event that gradual drift is observed in the measured thickness of the weld, this indicates that either this drift is linked to a drift in the process (for example an increase in the temperature of certain constituent components of the process), or this drift is linked to a gradual variation in the average thickness of the welded sheet. In order to maintain unchanged weld properties, thresholds can be set beyond which interventions are necessary. These interventions can consist, for example, in adjusting the settings of the machine.

According to some aspects of the present invention, the following advantages can be provided:

fewer discards, because measurement takes place continuously during production;

high-speed production, because measurement and analysis take place continuously during production, directly on the produced object (i.e., measurement of the thickness), without needing to slow the production speed;

real-time detection of defects during production;

the faulty package is identified before its final cutting operation and can be removed from production by a sorting process before the subsequent production and filling steps. This helps reduce the cost of discards;

detection and immediate correction of drifts in the process. This helps reduce the quantity of discards;

the possibility of detecting a malfunction in the machine when analyzing the measured signal, which also makes it possible to intervene swiftly on the production tool.

According to some aspects of the present invention, it is possible to improve the quality produced, for the following reasons, inter alia:

It is possible to permit inspection of 100% of the produced packages, with quantification of the quality of the produced packages (for example by defining a standard derived from the tolerances and deviation of the measured values) relative to the requirements of the end client for the produced products.

The properties of the weld are guaranteed owing to a control chart on which the thickness of the weld is continuously measured.

Simultaneously measuring the roughness of the weld makes it possible to detect one-off defects (dust, plastic granules, etc.)

the tracking and tracing of production batches and products.

As indicated above, the difficulties to be overcome are, in particular, as follows:

The accuracy required in order to ensure consistent weld properties stems from very small variations in thickness such that the accuracy of the measurement must be lower than 10 microns and preferably than 5 microns.

The desired accuracy of the measurement is approximately 10 times finer than the amplitude of the interference noise.

The amplitudes of the thickness variations that are to be measured are lost in the interference noise.

Some aspects of the invention related to a welding process in which the thickness of the weld is measured continuously, in real time, during production, with an acquisition frequency higher than 100 Hz and preferably higher than 1000 Hz, other values being possible within the context of the invention. According to the invention, the measured primary temporal signal is transformed into a frequency signal. In this frequency signal, at least one secondary signal is reconstructed from the low frequencies. Preferably, according to one embodiment, three secondary signals are reconstructed:
- A low-frequency secondary signal from the low frequencies
- A medium-frequency secondary signal from the medium frequencies
- A high-frequency secondary signal from the high frequencies The low-frequency secondary signal is calculated from the primary signal using the spectrum of frequencies lower than $f_1$. According to the invention, the value of $f_1$ is higher than $C_m/60$, which would correspond to the acquisition of one measurement point per package, and preferably higher than $(C_m/60)*(L_e/10)$, which would correspond to one measurement point every 10 mm; in which:
- $f_1$: frequency in Hertz
- $C_m$: speed of the machine in packages per minute
- $L_e$: length of the weld per package in mm The medium-frequency secondary signal is calculated from the primary signal using the spectrum of frequencies higher than $f_1$ and lower than a frequency $f_2$. According to the invention, the frequency $f_2$ is lower than $(C_m/60)*(L_e/0.01)$, which would correspond to the acquisition of one measurement point every 0.01 mm, and preferably lower than $(C_m/60)*(L_e/0.03)$, which would correspond to one measurement point every 0.03 mm; in which:
- $f_2$: frequency in Hertz
- $C_m$: speed of the machine in packages per minute
- $L_e$: length of the weld per package in mm The high-frequency secondary signal is calculated from the primary signal using the spectrum of frequencies higher than $f_2$. The sum of the secondary signals is equal to the initial primary signal.

The values indicated above are provided as illustrative examples, and other values are possible in the context of the present invention.

Using these secondary signals, the following analysis and measurement can be carried out:
- The low-frequency secondary signal is used to measure the thickness of the weld because the thickness variations are generally small and take place gradually;
- The medium-frequency secondary signal is used to measure the roughness of the weld because roughness generates a higher frequency signal than the thickness variations of the weld;
- The high-frequency secondary signal is used to detect anomalies and/or wear of the welding equipment and the system for acquiring the thickness signal and/or the production machine, because anomalies of this type generate frequency signals that are higher still.

These principles, advantages and embodiments of the present invention are set out in detail in the description that follows and in the appended figures.

BRIEF DESCRIPTION OF THE SEVERAL VIEWS OF THE FIGURES

FIG. 9 shows an electronic system or device for performing the measurements and providing the measured values to an external device for displaying or further data processing, according to another aspect of the present invention.

DETAILED DESCRIPTION OF THE SEVERAL EMBODIMENTS

Figure 1:
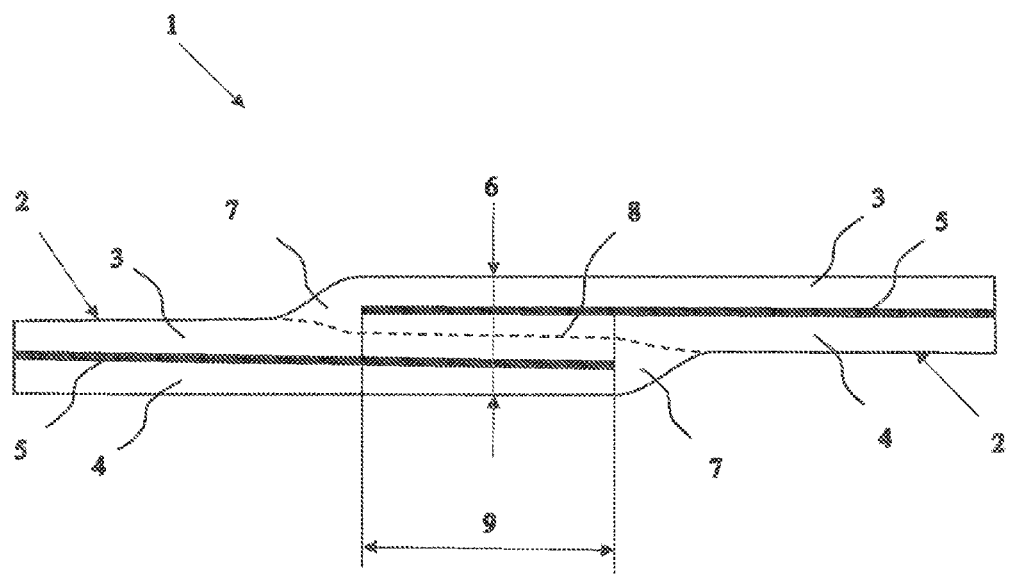
FIG. 1 shows an example of tube welding by overlapping the ends of a sheet.

FIG. 1 shows a first example of a weld 1 produced by overlapping the ends of a sheet (such as a laminate) in order to produce a package, for example a tube. Such a weld configuration is typically an example of that which is measured using a process according to the invention. Hereinafter, the following reference numerals are used for the following elements:
- 1 weld
- 2 ends of the sheet
- 3 top layer
- 4 bottom layer
- 5 functional layer
- 6 thickness of the weld
- 7 cast material
- 8 welded interface
- 9 overlap
- 10 main feeler
- 11 main sensor
- 12 frame of the machine
- 13 cylinder
- 14 counterpiece
- 15 measuring device
- 16 signal from the main sensor
- 17 secondary feeler
- 18 spring
- 19 secondary sensor
- 20 signal from the secondary sensor
- 21 reinforcing strip
- 22 weld bead
- 23 extruded layer
- 24 first signal conditioning circuit
- 25 second signal conditioning circuit
- 26 microprocessor or microcontroller
- 27 memory
- 28 display driver
- 29 network data connection interface
- 30 data processing device
- 31 display device
- 32 network
- 33 external data processing device, welding control device, server
- 34 database The ends of the laminate 2 (which is, in general, initially flat) are brought one on top of the other in order to form the overlap 9. The laminate is generally formed from at least three layers and, in this illustrative example, from a top layer 3, a bottom layer 4 and a functional layer 5 (as a barrier layer). The measurement referenced "6" defines the thickness of the weld (which will be measured according to the principle of the invention), reference number "7" shows cast material after the weld and reference number "8" indicates the welded interface between the ends.

The properties of the welds of the packages have an impact of the first order on the strength and seal tightness of the package, and also on the protection and conservation of the packaged products. For these reasons, a great deal of attention is paid to inspecting these welds in package production factories. The inspection points usually concern the welded interface 8, and the encapsulation of the ends of the functional layer 5. This encapsulation makes it possible to prevent said layer 5 from coming into contact with the packaged product and also helps limit the risks of delamination of the sheet 2 caused by the propagation, at the interface between the layer 5 and the layer 4, of components contained in the package. In order to ensure the encapsulation of the functional layer 5, the welding operation—consisting in heating, compressing and cooling the ends 2 to be assembled—has the effect of creating a flow of molten material from the layers 3 and 4 of the laminate during compression in order to create an accumulation of cast material 7 that covers the end of the layer 5. Since the welding operation is carried out by moving the sheet 2 at a constant speed through the components of the welding process, and all the parameters are kept constant (heating, pressure, cooling), the resulting weld varies little, in principle. The consistency of the properties of the weld 1 depends, inter alia, on the stability of the process and the properties of the laminate.

According to some aspects of the present invention, a single parameter of the weld is continuously measured (i.e., the thickness 6) in order to guarantee all the properties of the weld. According to this idea, stability in the weld thickness guarantees the stability of the properties of the weld and, conversely, variations in the characteristics of the weld have an impact on the thickness of the weld. This principle can only be applied if the thickness of the weld is measured continuously. If, for example, the measured weld thickness increases, this means that the weld is less compressed and, consequently, the quantity of cast material 7 is reduced. The thickness of the weld can increase for many reasons, such as, for example, an increase in the overlap 9, or indeed an increase in the thickness of the laminate or indeed a reduction in the energy delivered to the laminate to make it melt, or indeed a decrease in the compression pressure. Therefore, by measuring a single parameter (such as the thickness 6 of the weld), both the consistency of the properties of the weld and the stability of the entire welding process are measured. Similar reasoning can be applied for a reduction in the thickness 6 of the weld, which can also result in diminished weld properties, such as, for example, an excessively abundant quantity of cast material 7 resulting in defects in the appearance of the end product.

According to some aspects of the present invention, the process is initially set up to produce a weld that satisfies all the quality criteria, then measuring the variations in the thickness of the weld during production. The amplitude of the variations of the measured thickness 6 is used to evaluate and judge the quality of the welds continuously in real time.

The measurement of the thickness of the weld 1 needs to be highly accurate in order to be able to indirectly inspect, in real time, the stability of the properties of said weld. Existing inspection methods based on taking statistical samples from the production line and measuring said samples with laboratory equipment make it possible to obtain accurate and reproducible measurements. Experience has shown that the stability of the properties of the weld is ensured when the rate of compression of the weld falls within a range of plus or minus 2.5%. For example, for a laminate thickness of 250 microns, a variation in the rate of compression of 5% corresponds to a variation in the thickness of the weld 6 of 25 microns. A measurement accuracy finer than 5 microns is necessary in order to detect compression variations of the order of 1% and control the compression of the weld within a range of 5%. As a result of the invention, it is possible to obtain this measurement accuracy in line in the industrial environment of a production machine producing at a high production speed and generating interfering information that impairs the accuracy of the measurement taken.

Generally and systematically in the figures, the direction of production and movement of the sheet shown is perpendicular to the plane of the illustrated drawing.

Figure 2:
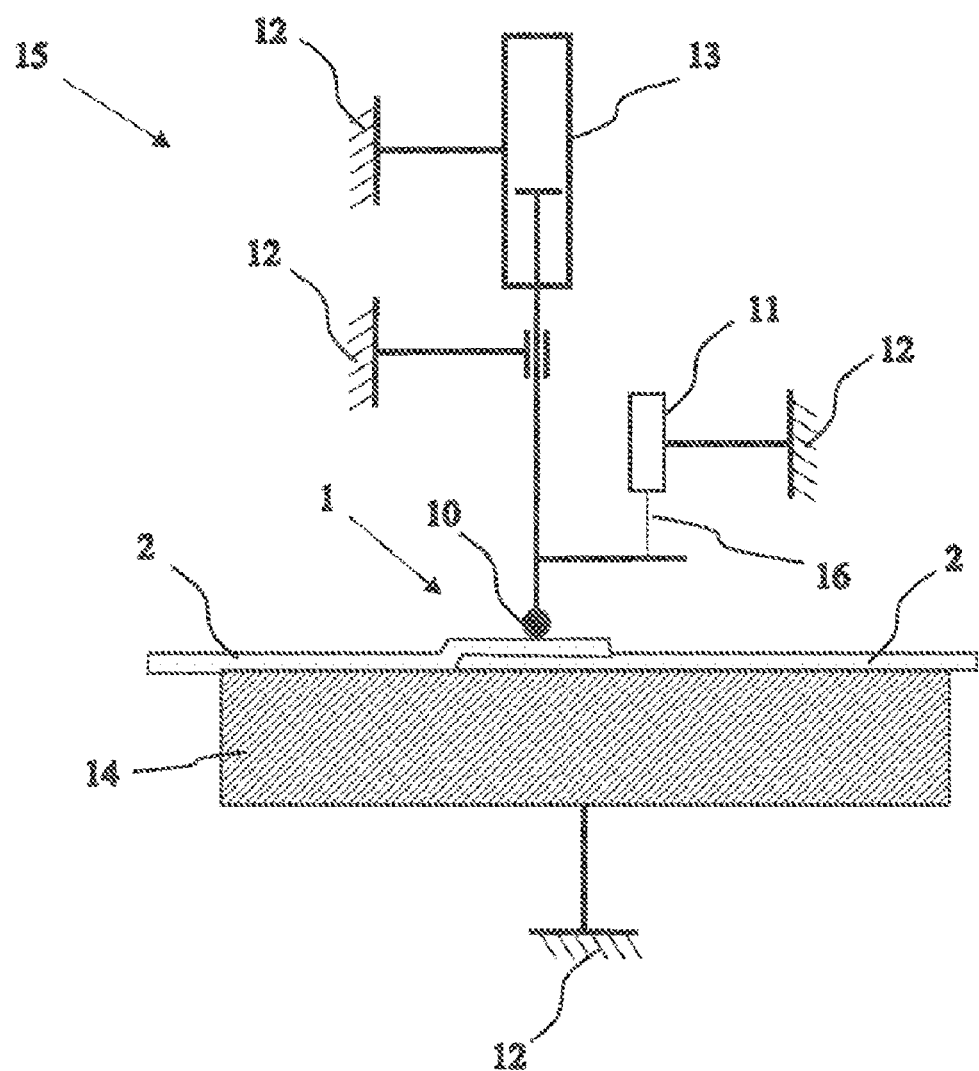
FIGS. 2 and 3 show principles of measuring the thickness of the weld on a production machine, according to one embodiment of the present invention.

FIG. 2 shows an embodiment of a device, for example a module, for implementing the process according to the present invention and measuring the thickness of the weld.

The laminate is, for example, that shown in FIG. 1 and the ends 2 overlap in the weld 1 zone. The device comprises a main feeler 10, for example a wheel, that moves over the weld 1 while the sheet is moving in order to measure the thickness of said weld. To this end, the module further comprises a main sensor 11, for example an inductive (or equivalent, for example optical) sensor, which measures the vertical movement of the wheel 10 by means of the signal 16. The inductive sensor allows highly accurate measurements of the order of 0.1 microns to be taken. However, as disclosed below, the signal measured by the sensor 11 is lost in a noise, the amplitude of which is of the order of 10 microns to 20 microns, i.e., 100 times the intrinsic accuracy of the measuring sensor and 5 to 10 times the required accuracy. Other types of sensors, such as, for example, optical sensors or sensors using another suitable technology, can be used. The wheel 10 is mounted on a cylinder 13 that is itself mounted on the frame of the machine 12. A counterpiece 14 that forms a base reference for the measurement is located underneath the sheet. The cylinder 13 allows the main feeler 10 to be raised when the machine is stopped for changes in configuration. Some of the interference noise is linked to the vibrations of the production machine and, in particular, the counterpiece 14. When making tubular bodies, said counterpiece 14 is in the form of a weld former around which the laminate is rolled. Said weld former is fastened to the frame 12 at one of its ends and is up to several meters long. This weld former also rests on drive belts moving the laminate at or in the vicinity of the measuring device 15. All these elements have the effect of generating significant vibrations in the counterpiece 14, which produces high amounts of noise at the measuring sensor 15. These disturbances generate interference noise, the amplitude of which is approximately 10 times higher than the desired accuracy of the measurement. The invention makes it possible to use all the information contained in the signal in order to:

accurately measure the thickness of the weld 6, detect the formation of dust at the weld or local thickness variations, control the quality of the acquisition chain of the measuring sensor, and finally establish a diagnosis of the wear and the quality of certain parts of the equipment.

Figure 3:
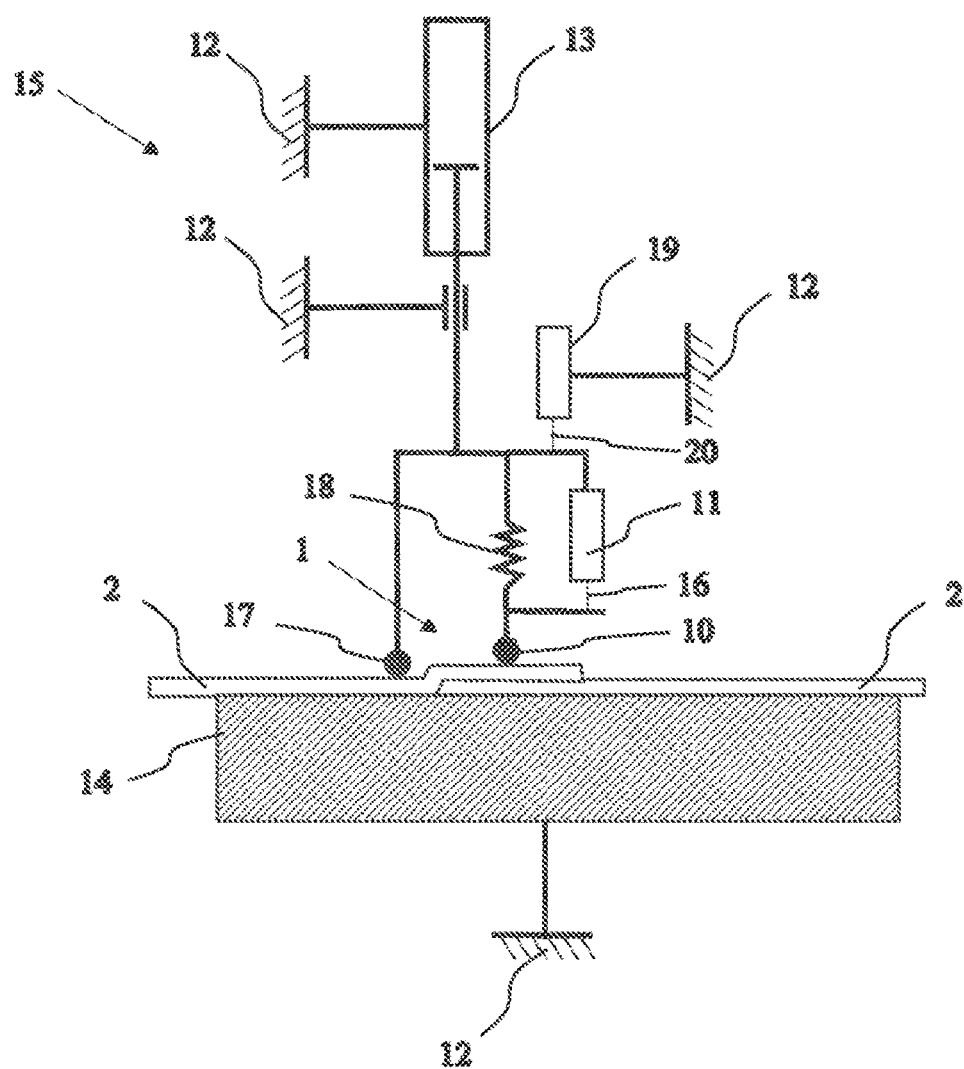

FIG. 3 shows another embodiment of a device for measuring the thickness of the weld 6. In this embodiment, the system is capable of taking a relative measurement of the thickness in relation to the non-welded laminate layer.

To this end, the measuring device or module comprises measuring means similar to those of FIG. 2, i.e., a sensor 10 (for example a wheel), a main sensor 11 (for example an optical sensor) emitting a signal 16 and a spring 18 holding the sensor 10 on the weld. Instead of being mounted on the frame of the machine 12, this measuring system is mounted on a secondary measuring device that comprises a secondary feeler 17 (such as a wheel) applied to the end of the laminate (for example to the end 2), a secondary sensor 19 (for example an optical sensor) emitting a secondary measurement signal 20. The secondary system is linked to the frame by the cylinder 13 and the secondary sensor 19 is also mounted on the frame. 14 remains the reference counterpiece. This measuring device comprising 2 sensors 11 and 19 allows the thickness of the laminate 2 and the thickness 6 of the weld to be measured. This device is particularly advantageous when the thickness of the laminate varies significantly. Measuring the thickness of the laminate makes it possible, in particular, to calculate the rate of compression of the weld, which should be kept constant, even if the thickness of the laminate varies.

This embodiment allows a relative measurement of the thickness of the weld in relation to the non-welded laminate to be made by using the signal from each feeler. In the event that the thickness of the laminate 2 varies very slightly and can be considered to be constant, the measuring device can be used without the sensor 19. This simplified device for measuring the thickness of the weld makes it possible to remove the interference noise linked to the vibrations of the counterpiece 14 from the measurement. On the other hand, the simplified device does not allow a diagnosis to be made concerning the counterpiece 14 and the parts of the equipment that create vibrations in said counterpiece 14.

Naturally, the sensors (feelers, optical sensors) described in the embodiments of the invention can use a suitable technology different to that mentioned in order to make the measurement required of them.

Figure 4A:
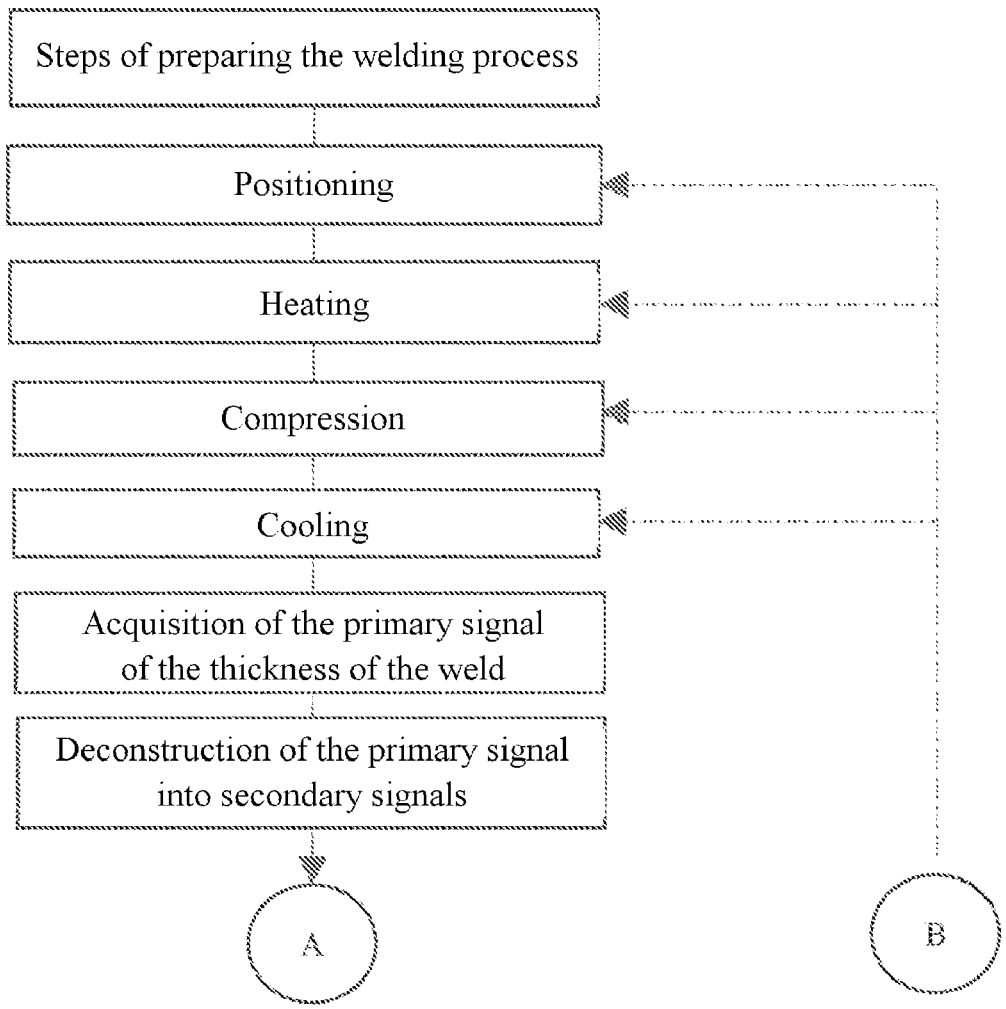
FIGS. 4a and 4b describe the process for continuously welding a sheet comprising the in-line measurement of the thickness of the weld. As described in the present application, the welding process according to one embodiment comprises, in particular, a phase of processing the measured thickness signal that makes it possible to obtain an accuracy of measurement approximately 10 times finer than the interference noise linked to the industrial environment.
Figure 4B:
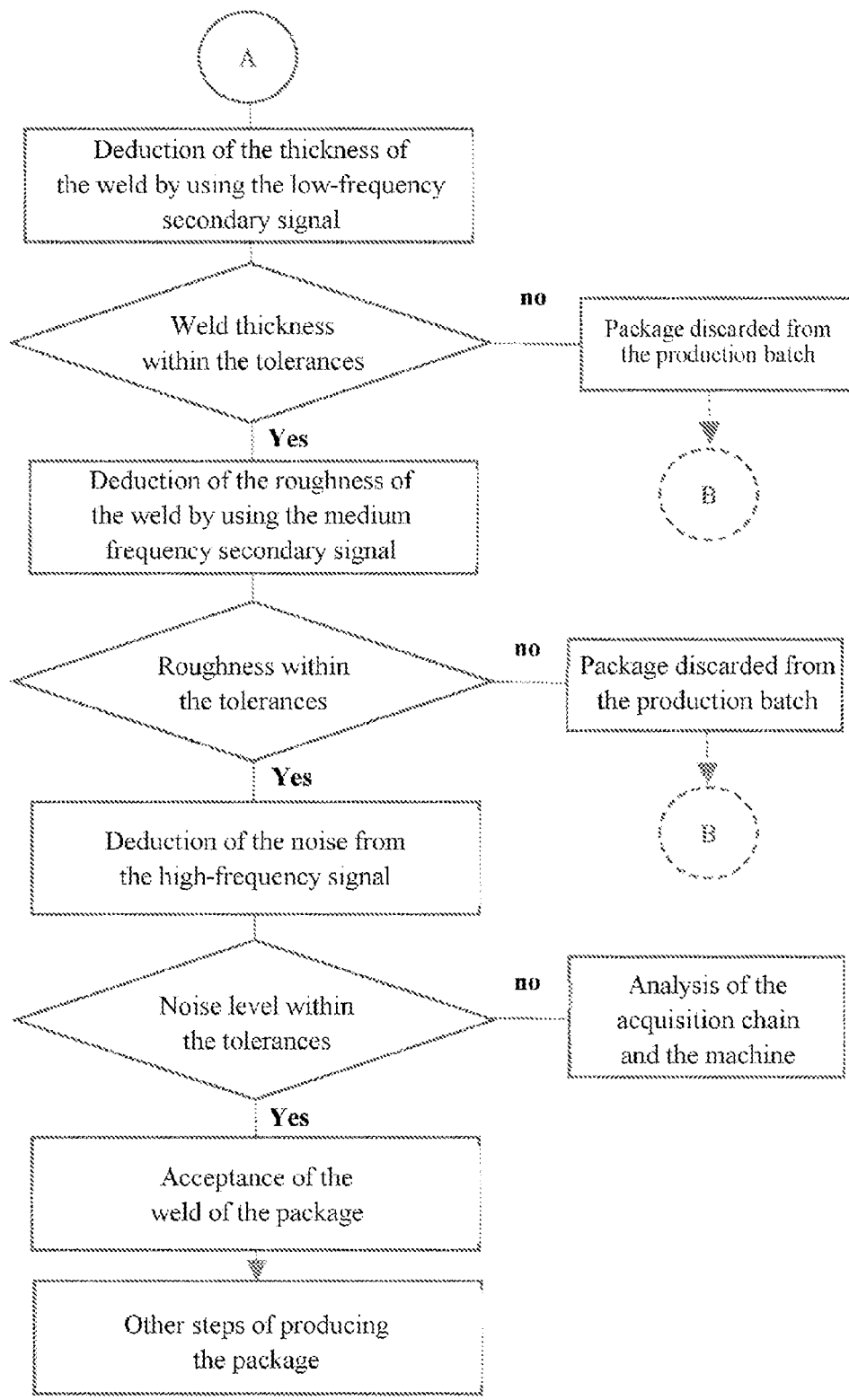

FIGS. 4a and 4b show an embodiment of the process according to the invention in the form of a block diagram.

In a first step, the welding process is prepared. The preparation step commonly includes, for example, the following series of operations (in a non-limiting manner):

unrolling the laminate, which is packaged in rolls;

adjusting the width of the laminate depending on the diameter of the tube to be produced and depending on the width of the overlap 9;

aligning the laminate with the welding process.

Other operations required for the production of the desired product can take place in the first step, such as, for example, printing operations, heat treatment operations or indeed texturing operations.

Next, the laminate is positioned for the weld, i.e.:

the sheet is positioned relative to the welding device;

ends of the sheet are placed in contact;

The operation of positioning the laminate consists, for example, in rolling the laminate around a weld former in order to form a cylindrical body.

Next, a welded zone is formed by heating, compressing and cooling the ends of the laminate. The ends of the laminate are then heated, compressed and cooled.

The heating operation consists, in particular, in melting at least the interface to be welded. There are many heating methods that can be used, such as, for example, heating methods using the principles of conduction, convection or radiation. Many direct or indirect heating technologies can be used, such as, for example, hot air, thermal pad, electromagnetic induction, or radiation.

The operation of compressing the weld can be carried out simultaneously or subsequent to the heating operation. The compression operation is in most cases necessary in order to guarantee a quality weld. Insufficient pressure can result in air inclusions in the welded interface and insufficient molecular entanglement, resulting in a reduction in the strength of the weld. As shown in FIG. 1, the operation of compressing the weld also allows the ends of the barrier layer of the laminate to be encapsulated.

Next, the weld is cooled. The operation of cooling the weld follows the heating and cooling operations. In certain cases, the cooling operation also takes place simultaneously to the heating and compression operations. For example, in order to protect the printed face of the laminate during the welding operation, it can be advantageous to keep the printed face of the laminate in contact with a cold tool while heating the interface and compressing the weld.

The operation that follows cooling and is shown in FIG. 4a consists in acquiring the signal corresponding to the thickness of the weld. This signal is referred to as the primary signal because it is in an unusable state due to the interference noise, the amplitude of which is approximately 10 times higher than the desired accuracy of the measurement. This signal is measured with a device like those shown, for example, in FIG. 2 or FIG. 3, and described above.

Periodically, the primary signal is reconstructed into at least one secondary signal. Preferably, this period corresponds to a characteristic period of the process and the production device. Advantageously, this period is linked to the production speed of the machine and, preferably, this period is linked to the speed of production of the packages. Thus, the signal is acquired in an uninterrupted manner by means of the measuring device described in FIG. 2 or FIG. 3; however, the signal is preferably analyzed in sets of points measured during a time interval corresponding to the production time of one or more packages. Naturally, the acquisition and the analysis can be carried out in other ways in the context of the present invention.

Hereinafter in the disclosure, the process of processing this set of points that will be referred to as the primary signal will be described. Advantageously, since this processing operation is carried out at the speed of production of the packages, it is possible to act during production in order to remove any faulty packages from production or act on any drift.

In one embodiment, the primary signal is at least reconstructed into one low-frequency secondary signal. In another embodiment, the primary signal is reconstructed into two secondary signals: a low-frequency secondary signal and a medium-frequency secondary signal or a high-frequency secondary signal. In another embodiment, the primary signal is reconstructed into three secondary signals, i.e., the low-frequency secondary signal, the medium-frequency secondary signal and the high-frequency secondary signal.

Methods for transforming and reconstructing temporal signals by frequency analysis are known and widely used in signal processing. These methods are based on known mathematical tools such as, for example, the Fourier transform, and use the algorithms derived therefrom. The method therefore consists in transforming the primary temporal signal into a frequency signal. The frequency spectrum of the primary signal is then deconstructed into several parts, at least into two parts, and preferably into three parts respectively forming a low-frequency, medium-frequency and high-frequency spectrum. The low-frequency spectrum is used in order to reconstruct (by inverse transform) a temporal signal referred to as the low-frequency secondary signal. Similarly, the medium-frequency spectrum is used to reconstruct the medium-frequency secondary temporal signal, and the high-frequency spectrum can be used to obtain the high-frequency secondary temporal signal.

FIG. 4b shows the sequence of operations carried out after the reconstruction of the primary signal into secondary signals.

Based on the low-frequency secondary signal, the measurement of the thickness of the weld is deduced with a high level of accuracy. First, the system is calibrated, for example relative to the top surface of the counterpiece 14, by placing the main feeler 10, for example a wheel, on this surface. Next, the main feeler 10 is applied to the surface of the weld (see FIG. 2) and the thickness can be determined by the main sensor 11 and its signal 16, which will vary in a manner proportional to the thickness. Next, during production, the feeler 10 continuously follows the surface of the weld, and this measurement provides the primary signal. In this primary signal, since any variations present in the thickness of the weld are gradual and of small amplitude, they form the low-frequency component of the primary signal that will be obtained in the transform. Preferably, the low-frequency signal is obtained from the spectrum of frequencies of the primary signal that are lower $f_1$. According to the invention, the value of $f_1$ is higher than $C_m/60$, which would correspond to the acquisition of one measurement point per package; and preferably higher than $(C_m/60)*(L_e/10)$, which would correspond to one measurement point every 10 mm; in which:

$f_1$: frequency in Hertz
$C_m$: speed of the machine in packages per minute
$L_e$: weld length per package in mm The low-frequency secondary signal can be used to measure the thickness of the weld with an accuracy finer than 10 microns and preferably finer than 5 microns.

The medium-frequency secondary signal is calculated from the primary signal using the spectrum of frequencies higher than $f_1$ and lower than a frequency $f_2$. According to the invention, the frequency $f_2$ is lower than $(C_m/60)*(L_e/0.01)$ which would correspond to the acquisition of one measurement point every 0.01 mm, and preferably lower than $(C_m/60)*(L_e/0.03)$, which would correspond to one measurement point every 0.03 mm; in which: $f_2$: frequency in Hertz $C_m$: speed of the machine in packages per minute
$L_e$: length of the weld per package in mm The medium-frequency secondary signal makes it possible to measure the roughness of the weld and, in particular, to detect one-off defects that can occur in the welded zone such as fine particles originating from the package or the production equipment. These fine particles create local thickness variations and can be caused by abrasion between the laminate and the welding device.

The high-frequency secondary signal is calculated from the primary signal using the spectrum of frequencies higher than $f_2$. The analysis of the high-frequency signal is used to establish a diagnosis of the correct operation of the thickness measuring device and the production equipment. An increase in the amplitude of the high-frequency secondary signal can indicate, for example, electromagnetic disturbance of the primary signal measured by the sensor or indeed wear to the production equipment.

Finally, the low-frequency secondary signal is used to determine the measured value of the thickness of the weld. According to one embodiment of the invention, the accuracy is finer than 10 microns and preferably finer than 5 microns.

A first embodiment of the invention consists in producing tubular bodies 180 mm in length at a production speed of 200 tubes per minute. The welded laminate has a thickness of 300 microns and the welded zone forms an overlap of 2 mm. The acquisition frequency is 2000 Hz. In this example:

The value of f1 is equal to 300 Hz and
The value of f2 is equal to 600 Hz.

A second embodiment of the invention consists in producing tubular bodies 80 mm in length at a production speed of 100 tubes per minute. The welded laminate has a thickness of 250 microns and the welded zone forms an overlap of 1.5 mm. The acquisition frequency is 2000 Hz. In this example:

The value of f1 is equal to 66 Hz and
The value of f2 is equal to 133 Hz

In one embodiment, the medium-frequency secondary signal is therefore also determined. This signal can be used to detect and characterize one-off defects in the weld such as dust or plastic aggregates that modify the surface condition and are therefore detected during the measurement.

FIG. 4b shows the steps of the process during the analysis of the measurement in the form of a block diagram.

Firstly, when the measurement is taken and the signal is acquired, the thickness value is determined from low-frequency signal. If this value is not within the predetermined tolerances, the package in question is rejected and discarded from the production batch after cutting. The tolerances of the low-frequency signal are often calculated from the rate of compression of the weld. A laminate 250 microns thick and a desired weld thickness of 420 microns, corresponding to a rate of compression of 16%, can be taken as an example. The acceptable amplitude of variation in the rate of compression can be considered to be 6%. The lower tolerance of the low-frequency secondary signal is therefore equal to 405 microns (corresponding to a rate of compression of 19%) and the upper tolerance is equal to 435 microns (corresponding to a rate of compression of 13%).

Generally, the tolerances of the low-frequency secondary signal are defined such that the variations of the rate of compression of the weld are lower than 10% and preferably lower than 5%. These values depend on the nature and the composition of the laminates. Some laminates are difficult to compress due to the rheological behavior of the materials they are made of and the welding device; for this reason, the choice of tolerances needs to be adjusted on a case-by-case basis depending on the laminate and the welding process used. If this value falls within the predetermined tolerances, it is possible to proceed to a second step, which is optional, of measuring the roughness of the weld. To this end, the roughness value is determined from the medium-frequency secondary signal. If the roughness value is not within the required tolerances, the package in question is rejected and discarded from the production batch after cutting. Naturally, if the package has already been considered to be non-compliant during the first step (weld thickness inspection), it is not necessary to perform this second roughness measurement. It is a waste of time and resources because the package will be rejected in any case.

The tolerance of the medium-frequency secondary signal is preferably less than +/−5 microns and advantageously less than +/−3 microns. Adjusting the thresholds to +/−3 microns makes it possible to remove from the production batch, in real time, all the packages in which dust or roughness defects larger than 3 microns are detected. If the roughness value is within the tolerances, it is still possible to deduce and analyze the noise in the high-frequency secondary signal, this noise being linked to the operation of the production machine. If this noise is not within the required and/or predetermined tolerances, this means that the machine is not functioning correctly and needs to be repaired/adjusted.

The adjustment of the tolerance of the high-frequency secondary signal depends on the welding device, its production speed, and its overall condition. The high-frequency secondary signal also gives an indication of the quality of acquisition chain acquiring the primary signal for measuring the thickness of the weld. According to the invention, the high-frequency secondary signal is a diagnostic tool for diagnosing both the production equipment and the acquisition chain. For new production equipment producing at a speed of 100 packages per minute, corresponding to a linear welding speed of the order of 20 m/min, the chosen tolerances are lower than +/−80 microns and preferably lower than +/−40 microns.

If the noise is within the tolerances (for example, predetermined values), the weld of the package is accepted, and it is possible to proceed to the other steps of producing the package.

In one variant, it is possible, during the analysis, to take into account only the weld thickness parameter, and not the roughness or the machine noise, and to decide on the compliance of the package based only on this single criterion.

In another variant, it is possible to take only two of the three criteria into account (thickness and roughness or machine noise).

This choice of the number of criteria can be determined by the type of product produced and the range of said product (luxury or bottom-of-the-range product).

Although the diagram in FIG. 4b shows the steps taking place in succession, it is clear that the analysis of the secondary signals and the calculations can be carried out in parallel in order to optimize the time required to process the information.

In these figures, the circled references "A" and "B" are shown in order to provide the link between FIGS. 4a and 4b. For example, after the final operation or step of FIG. 4a, i.e., "deconstruction of the primary signal into secondary signals", the process proceeds to the first operation or step of FIG. 4b, i.e., the "deduction of the thickness of the weld by using the low-frequency secondary signal".

Similarly, in FIG. 4b, in the operation "package discarded from the production batch" (see the right-hand side of FIG. 4b), the circled reference "B" indicates a return to the same circled reference "B" in FIG. 4a and action on the machine adjustment and preparation parameters, in particular on the positioning and/or heating and/or compression and/or cooling. These steps have been described above in detail.

FIGS. 5 to 8 show other examples of welds that can be produced and measured with the principles of the invention.

Figure 5:
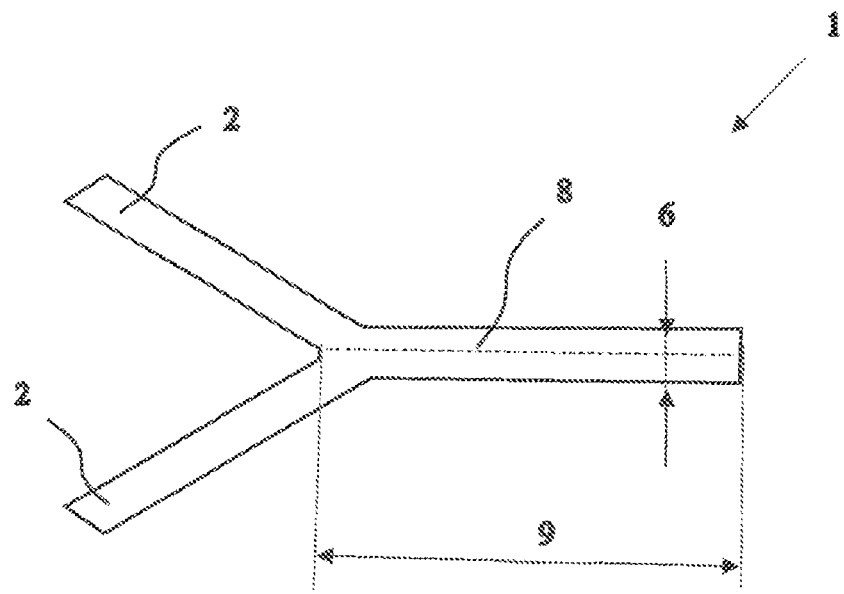
FIGS. 5 to 8 show other examples of welds that can be produced and measured according to the invention.
Figure 6:
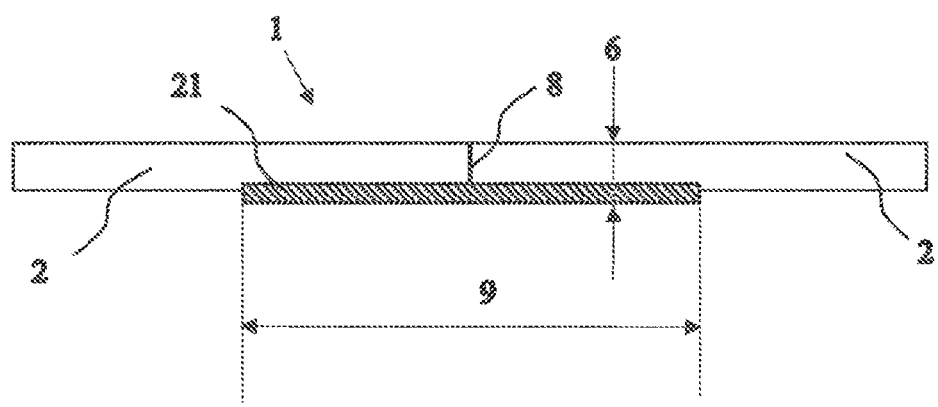
Figure 7:
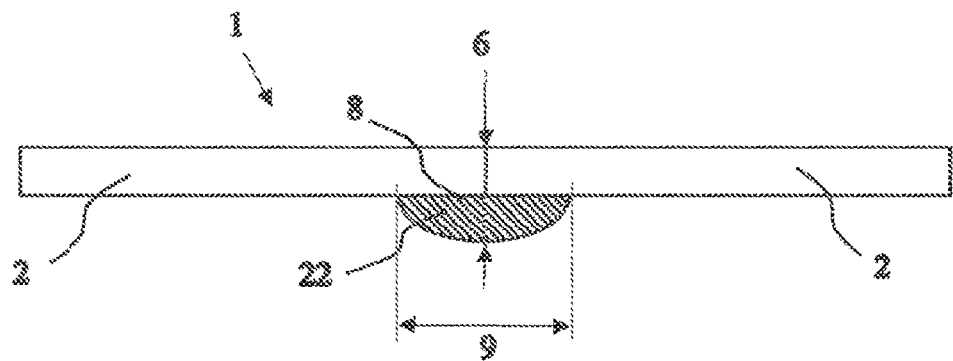
Figure 8:
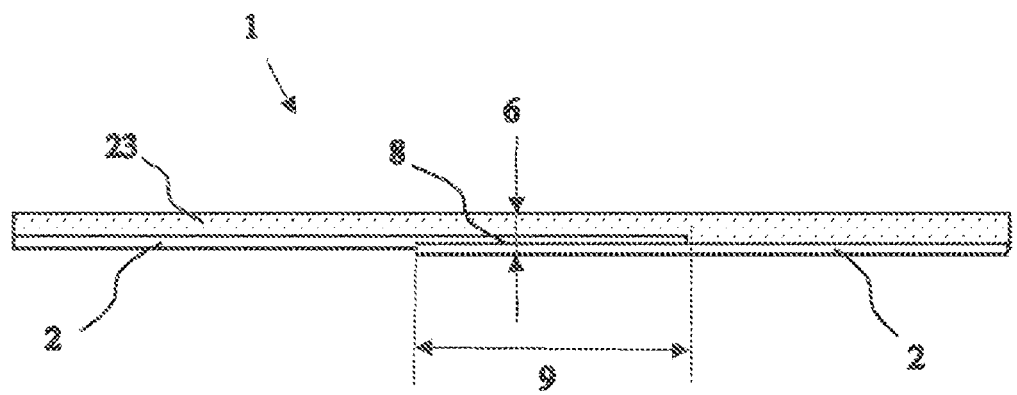

FIG. 5 shows a weld produced by overlapping two ends 2, FIG. 6 a butt weld with a reinforcing strip 21 covering the weld interface 8, FIG. 7 another butt weld with a weld bead 22 and FIG. 8 a lap weld with an extruded layer 23. The principles of the invention can be applied to all these assembly configurations, and others as well, in order to measure the thickness of the weld 6 according to the disclosure above.

FIG. 9 shows a simplified, exemplary schematical view of a data processing device 30, display device 31, and networked external device 33 for the data processing of the data of the thickness of the weld 6. For example, data processing device 30 can perform data acquisition of data from main sensor 11 and optionally the secondary sensor 19, to process the data for obtaining a value for the thickness of the weld 6, and can also perform data outputting functions, for example for displaying the measured results of the thickness on a display device 31, for example the thickness of the weld 6, or for transmittal data of the thickness of the weld 6 to an external data processing device 33 for further data processing and system control.

Data processing device 30 is operatively interconnected with main sensor 11 and optionally the secondary sensor 19, and signals of main sensor 11 and optionally secondary sensor 19 can be received by a first and a second signal conditioning circuits 25, 24. Depending on the type of signal that is provided by sensors 11, 19, first and a second signal conditioning circuits 25, 24 can include but are not limited to signal amplifiers, analog or digital filters or both, analog-to-digital converters, optical-to-electric converters, bus network controllers if signals based on an interface protocol are provided, buffers, Universal Serial Bus (USB) interfaces, wireless data receivers, infrared communication ports. First and a second signal conditioning circuits 25, 24 are in turn operatively connected to a microcontroller, microprocessor, or other type of data processing device 26, for further data processing on the measurement values from sensors 11, 19, for example but not limited to signal filtering such as averaging, median filtering, statistical signal analysis, frequency transformation, signal normalizing and calibration, signal archiving, and other type of digital signal processing.

For example, with the microprocessor 26 and the associated memory 27, it is possible to perform the calculations necessary to reconstruct the primary signal into one low-frequency secondary signal, according to some aspects of the invention, or to reconstruct the primary signal into two secondary signals, being a low-frequency secondary signal and a medium-frequency secondary signal or a high-frequency secondary signal. In a variant, the primary signal is reconstructed into three secondary signals, i.e., the low-frequency secondary signal, the medium-frequency secondary signal and the high-frequency secondary signal. These calculations can be performed by using the microprocessor 26 and memory 27 to perform Fourier transformations in the frequency domain, for example by fast Fourier transformation (FFT), or other type of time-to-frequency domain transformations.

As indicated above, data processing device 30 can further include a memory 27 that is in operative connection with microprocessor 26 by a data bus, for example a random access memory as a working memory, or programmable flash memory for storing computer instructions therein. For example, computer instructions can be stored in memory 27 for performing data acquisition related to weld thickness, computer instructions for signal conditioning and normalization, and for outputting the data via data network communication interface 29, display driver 28, or both. In this respect, memory 27 can include computer readable instructions that can be executed on the microprocessor 26 to perform the steps of the method that require data processing, for example the steps of transforming, reconstructing, and determining.

Next, a value or data of the thickness of weld 6 that has been acquired by data processing device 30 and processed by microprocessor 26 can be displayed on a display screen 31 for review by a user, for example by sending the data to a display driver 28. Display driver 28 can be configured to display the measured thickness of the weld with a graphical user interface (GUI), and the thickness of the weld can be displayed as a number or a time-evolving graph as a real word value, for example with a graphical indication of the physical dimension of the weld, and a progressing time value representing the continuous nature of the underlying welding process.

Moreover, microprocessor 26 can also send a value or data of the measured thickness of weld 6 with a data network communication interface 29 via a network 32 to another external data processing device 33, for example a system controller or embedded industrial controller, that is configured to control the welding machine or device that is performing the welding process, to other types of external data processing devices such as servers, portable computers, embedded computers, controllers, smartphones, main stations. For example, it is possible that a value or data of the measurements of the weld thickness is sent to a cloud server for archiving in a database 34. In this respect, network 32 could be a real-time industrial data bus system operating with an appropriate data protocol, for example, a CAN bus, Modbus, Fieldbus, or can be another more generic data communication interface such as a Universal Serial Bus (USB), Ethernet network, Internet, local area network, or other type of data communication bus. It is also possible that the data network communication interface 29 is a wireless interface such as but not limited to IrDA, Bluetooth, Wifi, GSM-type cellphone network, 4G, 5G.

The embodiments described in the present application are described as illustrative examples and should not be considered to be limiting. Other embodiments may use means that are the equivalent to those described, for example. The embodiments can also be combined with each other depending on the circumstances, or means and/or steps of the process used in one embodiment can be used in another embodiment. Therefore, for example, the numerical values are provided as illustrative examples and other values are possible, depending on the embodiments and products produced (products as such, product ranges, etc.).

The invention claimed is:

1. A process for continuous welding of a sheet of plastic material for manufacturing flexible packages, comprising the steps of:
    positioning the sheet relative to the welding device;
    putting ends of the sheet into contact;
    forming a weld by heating, pressing and cooling the ends of the sheet that are in contact;
    acquiring a primary temporal signal with a sensor, the primary temporal signal proportional to a thickness of the weld;
    transforming the primary temporal signal into a primary frequency signal and defining a low-frequency spectrum, a medium-frequency spectrum, and a high-frequency spectrum from the primary frequency signal;
    reconstructing a secondary low-frequency signal from the low-frequency spectrum; and
    determining the thickness of the weld based on the secondary low-frequency signal, the secondary low-frequency signal providing for an accuracy of a measurement of the thickness below 10 µm, such that the accuracy of the measurement is approximately ten times below than an amplitude of an interference noise.

2. The process as claimed in claim 1, wherein the primary signal is further reconstructed into a medium-frequency secondary signal from the medium-frequency spectrum, the medium-frequency secondary signal used to detect sudden variations in the thickness of the weld and/or one-off defects in the weld.

3. The process as claimed in claim 1, wherein the primary signal is further reconstructed into a high-frequency secondary signal from the high-frequency spectrum, the high-frequency secondary signal being used to characterize the welding device in a environment.

4. The process as claimed in claim 1, wherein the frequency of acquisition of the primary signal is greater than 100 Hz.

5. The process as claimed in claim 1, wherein the frequency of acquisition of the primary signal is greater than 1000 Hz.

6. The process as claimed in claim 1, wherein the low-frequency secondary signal is obtained from the spectrum of frequencies of the primary signal that are lower than $f_1$, $f_1$ being greater than $C_m/60$, wherein,
    $f_1$ is the frequency in Hertz, and
    $C_m$ is a speed of the manufacturing of the flexible packages expressed in flexible packages per minute.

7. The process as claimed in claim 1, wherein $f_1$ is greater than $(C_m/60) \times (L_e/10)$ and wherein,
    $f_1$ is the frequency in Hertz,
    $C_m$ is a speed of the manufacturing of the flexible packages expressed in flexible packages per minute, and
    $L_e$ is a length of the weld per flexible package in mm.

8. The process as claimed in claim 1, wherein the medium-frequency secondary signal lies within a spectrum of frequencies defined by a low-frequency secondary signal ($f_1$) and a frequency $f_2$, $f_2$ being less than $(C_m/60)*(L_e/0.01)$, wherein,
    $f_2$ is the frequency in Hertz,
    $C_m$ is a speed of the manufacturing of the flexible packages expressed in flexible packages per minute, and
    $L_e$ is a length of the weld per flexible package in mm.

9. The process as claimed in claim 1, wherein $f_2$ is less than $(C_m/60)*(L_e/0.03)$, wherein,
    $f_2$ is the frequency in Hertz,
    $C_m$ is a speed of the manufacturing of the flexible packages expressed in flexible packages per minute, and
    $L_e$ is a length of the weld per flexible package in mm.

10. The process as claimed in claim 1, wherein the high-frequency secondary signal lies within a spectrum of frequencies that is higher than a range of the medium-frequency secondary signal.

11. The process as claimed in claim 1, further comprising a step of:
    calibrating the measurement of the thickness of the weld.

12. The process as claimed in claim 1, wherein the accuracy of the measurement of the thickness below 5 µm.

* * * * *